US008540400B2

(12) United States Patent
Jakobsen et al.

(10) Patent No.: US 8,540,400 B2
(45) Date of Patent: Sep. 24, 2013

(54) ENCODING DEVICE AND A METHOD OF ENCODING

(75) Inventors: Michael Linde Jakobsen, Roskilde (DK); Vagn Steen Gruner Hanson, Fakse (DK); Henrik Chresten Pedersen, Jyllinge (DK)

(73) Assignee: O-Net Wavetouch Limited, Central (HK)

( * ) Notice: Subject to any disclaimer, the term of this patent is extended or adjusted under 35 U.S.C. 154(b) by 17 days.

(21) Appl. No.: 13/384,112

(22) PCT Filed: Jul. 16, 2010

(86) PCT No.: PCT/DK2010/000109
§ 371 (c)(1),
(2), (4) Date: Apr. 2, 2012

(87) PCT Pub. No.: WO2011/006499
PCT Pub. Date: Jan. 20, 2011

(65) Prior Publication Data
US 2012/0188773 A1 Jul. 26, 2012

(30) Foreign Application Priority Data
Jul. 16, 2009 (DK) .................................. 2009 70066

(51) Int. Cl.
*F21V 7/00* (2006.01)
*G06F 3/042* (2006.01)
(52) U.S. Cl.
USPC ...... 362/296.01; 362/610; 362/615; 362/511; 362/296.1; 362/311.12; 362/257; 385/15; 345/176

(58) Field of Classification Search
None
See application file for complete search history.

(56) References Cited

U.S. PATENT DOCUMENTS

| 6,008,798 A | 12/1999 | Mato |
| 7,366,376 B2 * | 4/2008 | Shishkov et al. ............... 385/35 |
| 2008/0007540 A1 | 1/2008 | Ostergaard |
| 2008/0278460 A1 | 11/2008 | Arnett |
| 2010/0028018 A1 * | 2/2010 | Tan et al. ....................... 398/141 |
| 2011/0025620 A1 * | 2/2011 | Jakobsen et al. ............... 345/173 |

FOREIGN PATENT DOCUMENTS

| GB | 2131544 A | 6/1984 |
| WO | 2009/086836 A1 | 7/2009 |

* cited by examiner

*Primary Examiner* — Ashok Patel
(74) *Attorney, Agent, or Firm* — Polsinelli PC; Teddy C. Scott, Jr.; Ron Galant

(57) ABSTRACT

The present invention relates to an encoding device, such as an optical position encoder, for encoding input from an object, and a method for encoding input from an object, for determining a position of an object that interferes with light of the device. The encoding device comprises a light source, a waveguide, a number of redirecting structures, and a detector. By means of the waveguide and the number of redirecting structures, light from the light source is guided towards the detector along a path that includes traversing an area in a space next to the planar waveguide. An object may be positioned in the area in the space and may interfere with the light, which interference may be encoded into a position or activation.

11 Claims, 13 Drawing Sheets

ENCODING DEVICE AND A METHOD OF ENCODING

CROSS-REFERENCE TO RELATED APPLICATIONS

The present application is the national stage of International Application No. PCT/DK2010/000109, filed on Jul. 16, 2010, which claims the benefit of PA 2009 70066, filed on Jul. 16, 2009, the contents of all of which are hereby incorporated by reference.

The present invention relates to an encoding device, such as an optical position encoder and a method of encoding an object, such as determining a position of an object that interferes with a number of light rays.

US2008/0278460 A1 discloses a method of encoding the position of an object interfering with two orthogonal light sheets, in which two arrays of detectors—distributed along the entire widths of the light sheets—capture images of the light sheets in order to locate intensity dips in the light sheets. These dips are caused by the object that locally blocks parts of the light sheets, hence, the two-dimensional position of the object may be determined.

WO 2009/086836 A1 discloses optical position encoder and a method of encoding the position of an object touching a touch-surface of the optical position encoder.

It is an object of the present invention to provide an optical position encoder (or input encoder) that can be manufactured at a low cost.

According to the present invention, the above-mentioned and other advantages are fulfilled by a device for encoding input from an object, the device comprising a light source, a waveguide, a number of redirecting structures, and a detector. The waveguide may comprise a planar waveguide having a first surface and a second surface. The number of redirecting structures may comprise a first redirecting structure and a second redirecting structure. The light source may be configured for emitting light into the waveguide, such that the planar waveguide may guide a first part of the light from the light source towards the first redirecting structure. The first redirecting structure may be configured for redirecting the first part of the light towards the second redirecting structure e.g. by coupling the first part of the light out of the waveguide and at least substantially collimating the first part of the light into e.g. a first plurality of at least substantially collimated rays that may traverse e.g. an area in a space (e.g. a first area of a first space) next to the first surface of the planar waveguide towards the second redirecting structure. The second redirecting structure may be configured for redirecting the first plurality of at least substantially collimated rays towards the detector e.g. by coupling the first plurality of at least substantially collimated rays back into the waveguide and directing, e.g. focusing, the first plurality of light rays towards the detector. The object may disturb a first ray of the first plurality of at least substantially collimated rays when the object is at least partly positioned in the space (e.g. the first area) during operation of the device.

A device having one small light source and one small detector array (or one small detector) result in reduced manufacturing costs, compared with known position encoding devices.

According to the present invention, the above-mentioned and other advantages are fulfilled by a method of encoding an object in the vicinity of a device comprising a light source, a waveguide that may comprise a planar waveguide having a first surface and a second surface, a number of redirecting structures that may comprise a first redirecting structure and a second redirecting structure, and a detector. The method may comprise emitting light from the light source into the waveguide, such that the planar waveguide may guide a first part of the light from the light source towards the first redirecting structure. The method may comprise redirecting the first part of the light towards the second redirecting structure, e.g. by coupling the first part of the light out of the waveguide and e.g. at least substantially collimating the first part of the light into e.g. a first plurality of at least substantially collimated rays that e.g. traverse an area in a space next (e.g. a first area of a first space) to the first surface of the planar waveguide towards the second redirecting structure, e.g. using the first redirecting structure. The method may comprise redirecting the first plurality of at least substantially collimated rays towards the detector by e.g. coupling the first plurality of at least substantially collimated rays back into the waveguide and e.g. directing the first plurality of light rays towards the detector, e.g. using the second redirecting structure. Furthermore, the object may disturb a first ray of the first plurality of at least substantially collimated rays when the object is at least partly positioned in the space (e.g. the first area) during operation of the device.

BRIEF DESCRIPTION OF THE DRAWINGS

Features and advantages of the present invention will become readily apparent to those skilled in the art by the following detailed description of exemplary embodiments thereof with reference to the attached drawings, in which.

The figures are schematic and simplified for clarity, and they may merely show details which are essential to the understanding of the invention, while other details may have been left out. Throughout, the same reference numerals are used for identical or corresponding parts.

It should be noted that in addition to the exemplary embodiments of the invention shown in the accompanying drawings, the invention may be embodied in different forms and should not be construed as limited to the embodiments set forth herein.

Rather, these embodiments are provided so that this disclosure will be thorough and complete, and will fully convey the concept of the invention to those skilled in the art.

DETAILED DESCRIPTION

Figure 1:
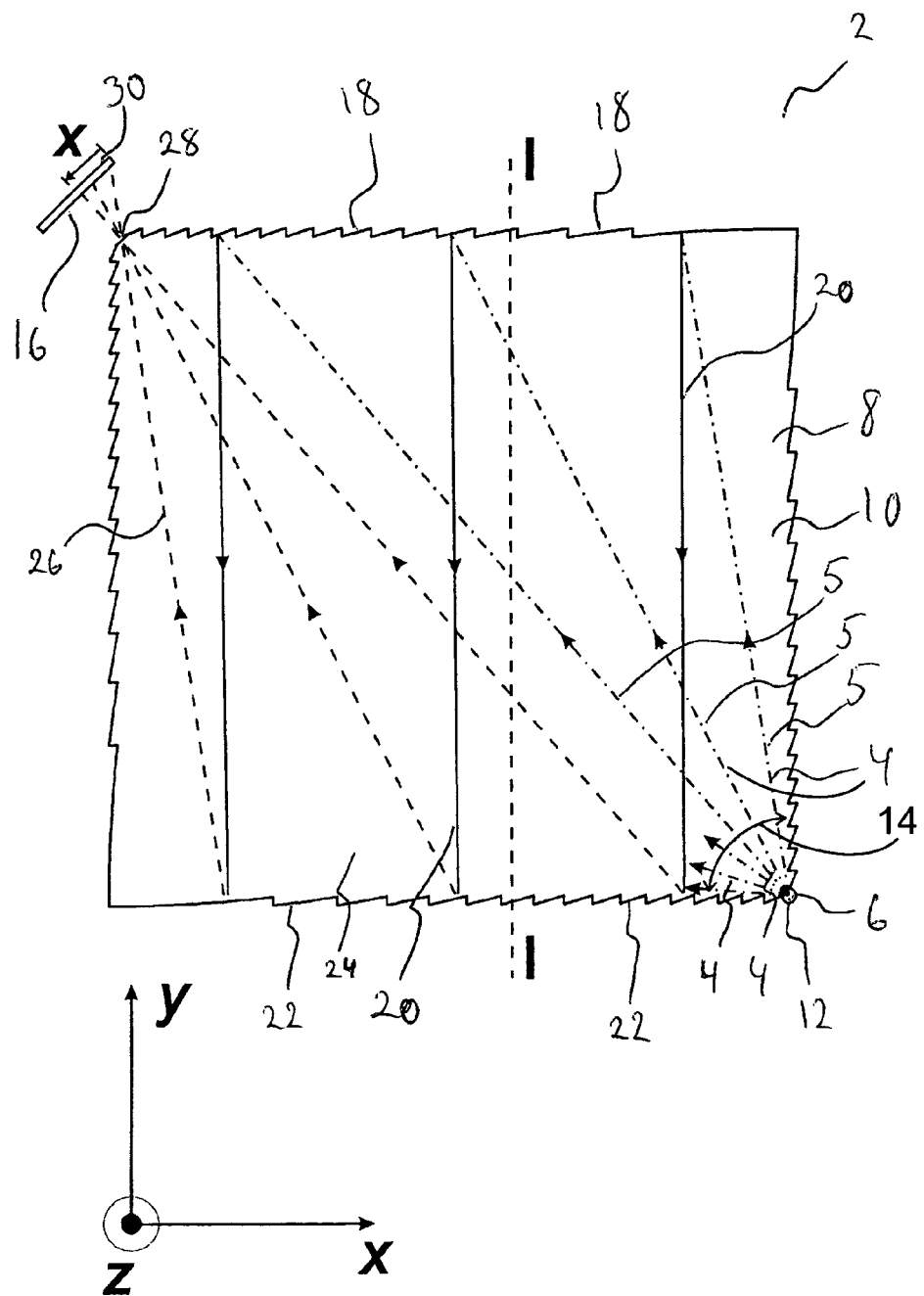
FIG. 1 schematically illustrates a plane view of a first embodiment of a device according to the present invention.
Figure 2:
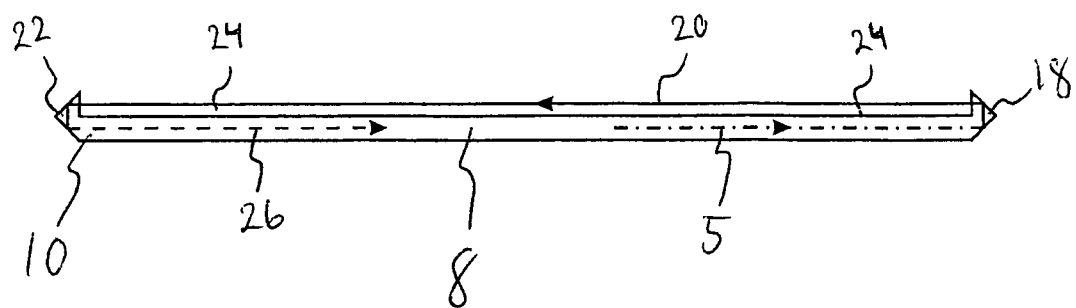
FIG. 2 illustrates a cross section taken along the line I-I of FIG. 1, FIG. 3 schematically illustrates a plane view of the first embodiment.
Figure 2:
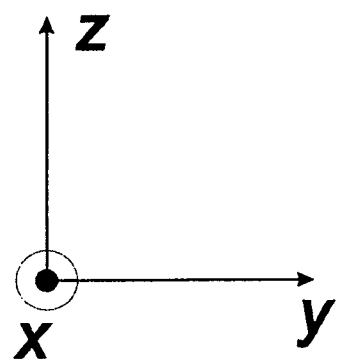

FIGS. 1-4 show top and cross-sectional views, respectively, of a first embodiment of a device 2 for position encoding according to the present invention. In FIG. 1 is shown light 4 from a light source 6 (schematically represented by a point source) which light 4 is coupled into a planar waveguide part 8 of a waveguide 10 at a first corner 12 of the waveguide. The divergence angle 14 of the light 4 may be approximately 90 deg. or less measured in the plane of the waveguide 10. The device 2 is adapted for the light 4 to diverge in order to illuminate at least part of the device 2 by means of the light 4. For simplicity, in FIG. 1 a first half of the angular range is represented by three rays 5. The paths of the three rays 5 are illustrated from the light source 6 and traversing along different paths to the detector array 16. The first part of the light from the light source, which is represented by the three dot-dashed lines in FIG. 1, diverges from the light source towards the first redirecting structure 18. Diverging light from the point source may form a guided, diverging light sheet that illuminates the first redirecting structure 18. The first redirecting structure couples the light out of the waveguide 10, as illustrated in the cross-sectional view I-I in FIG. 2, collimates the light to be parallel with the y-axis, and directs the light, which is represented by solid rays 20 in FIGS. 1 and 2, towards the second redirecting structure 22. Thus, the light propagating from the first redirecting structure to the second redirecting structure forms a number of at least substantially collimated light rays propagating next to the first surface 24 of the waveguide, as illustrated in FIG. 2. The second redirecting structure redirects the at least substantially collimated light rays, which is represented by the dashed lines 26 in FIGS. 1 and 2, back into the waveguide and focus the light rays towards a second corner 28 of the waveguide. At the second corner of the waveguide, the light is coupled out of the waveguide to be diverging in the x-y plane and incident on the first part 30 of the detector array 16. Alternatively to be placed behind the focus point, the detector array may be situated in front of the focus point.

Figure 3:
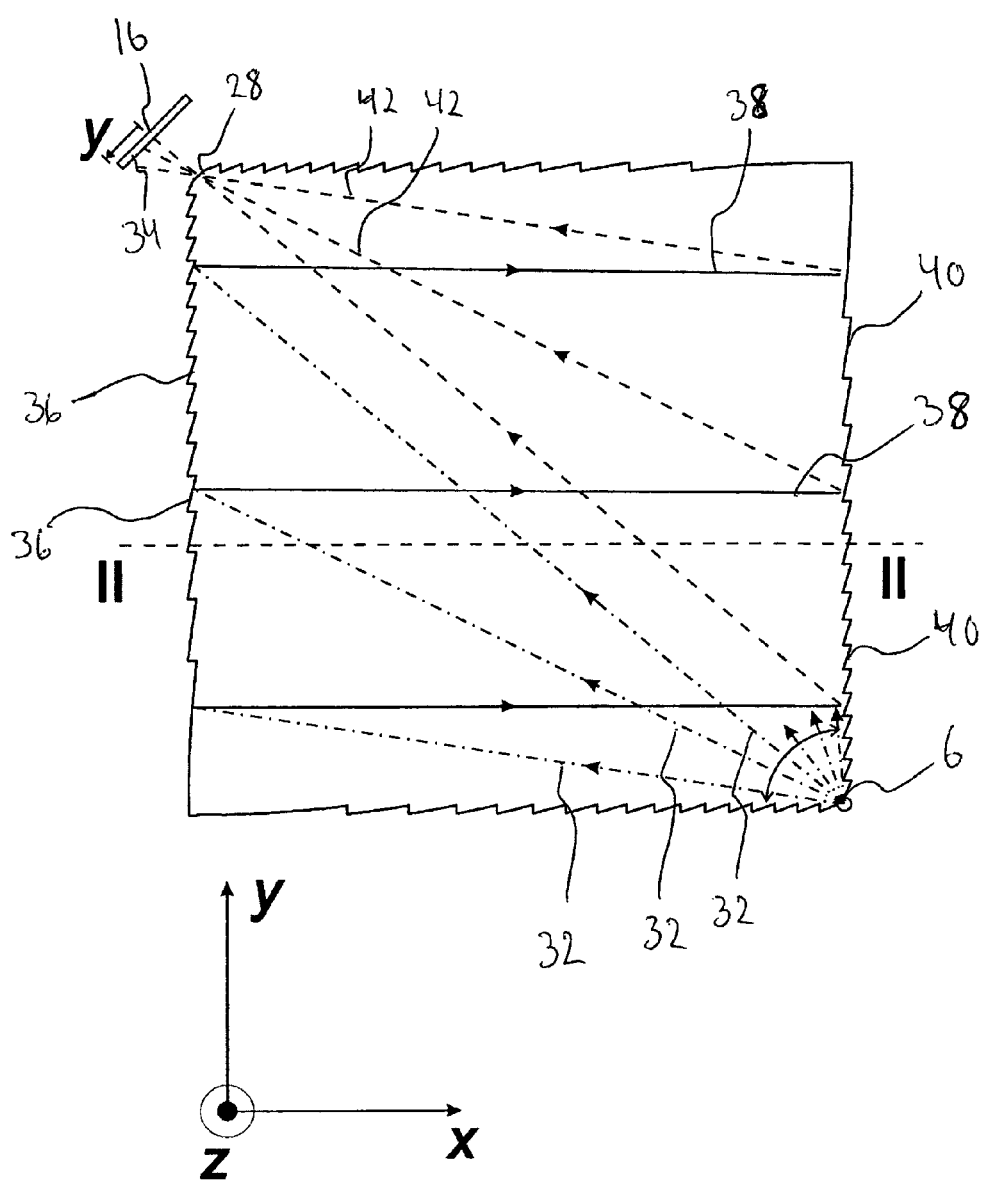
Figure 4:
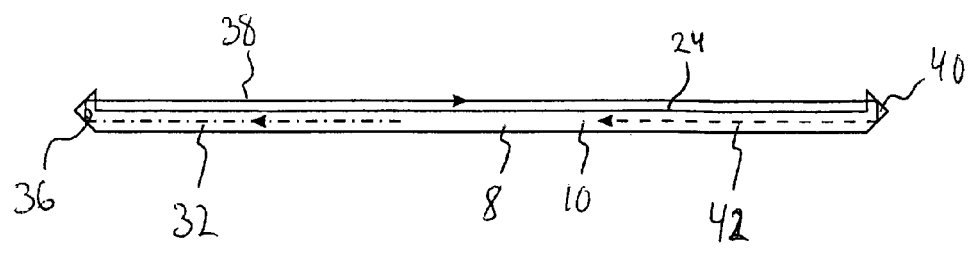
FIG. 4 illustrates a cross section taken along the line II-II of FIG. 3, FIG. 5 schematically illustrates an exemplary angle of propagation of light coupled into the waveguide, FIG. 6 schematically illustrates a plane view of a second embodiment of a device according to the present invention.
Figure 4:
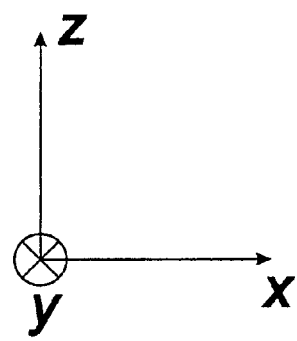

In FIG. 3 a second half of the angular range, which is also represented by three rays 32, is illustrated. The paths of the three rays are shown from the emitter 6 to the detector array 16. The rays 32, which are represented by three dot-dashed lines in FIG. 3, diverge from the light source 6 to the second part 34 of the detector array 16. The second part of the light from the light source may form a guided light sheet that illuminates the third redirecting structure 36. The third redirecting structure redirects the second part of the light by coupling the second part of the light out of the waveguide 10, as illustrated in the cross-sectional view II-II in FIG. 4, and at least substantially collimating the light to be parallel with the x-axis. Thus, the light, represented by solid rays 38 in FIGS. 3 and 4, is redirected towards a fourth redirecting structure 40. The light propagating from the third redirecting structure to the fourth redirecting structure forms a number of at least substantially collimated light rays propagating next to first surface 24 of the waveguide, as illustrated in FIG. 4. The fourth redirecting structure 40 redirects the at least substantially collimated light by and coupling it back into the waveguide 10 and focussing the light, which is represented by the dashed lines 42 in FIGS. 3 and 4, towards the second corner 28 of the waveguide. At the second corner, the light is coupled out from the planar waveguide and is incident on the second part 34 of the detector array. Alternatively to be placed behind the focus point, the detector array 16 may be situated in front of the focus point.

If the object (not shown) approaches the first surface 24 of the waveguide 10, at least one light ray of each of the number of at least substantially collimated light rays 20, 38 may be blocked. Such a blocking of at least one light ray of each of the number of at least substantially collimated light rays 20, 38 may lead to a first dip in the light intensity profiles measured at the first part of the detector array and a second dip in the light intensity profile measured at the second part of the detector array. The positions of the dips may be directly related to the x- and y-coordinates of the object in relation to the device.

Figure 5:
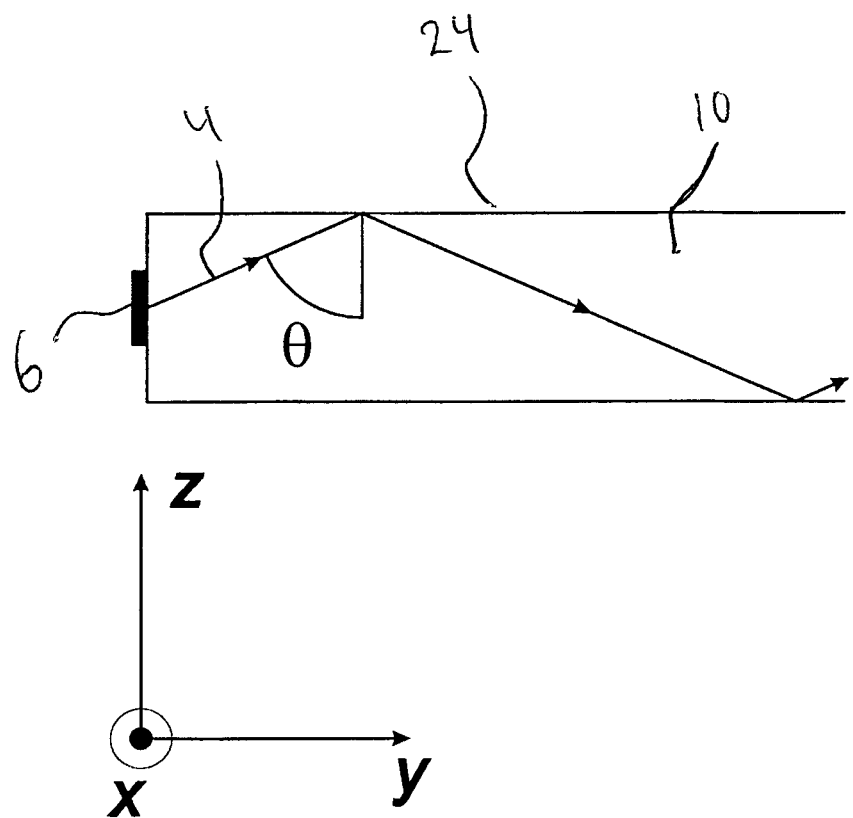

The light 4 from the light source 6 may be coupled into the waveguide 10 in such a way that the angle of propagation θ shown in FIG. 5 fulfils the following relation:

$$n_W \sin(\theta) > n_O,$$

where $n_W$ is the refractive index of the waveguide and $n_O$ is the refractive index of the object (or a coating of the waveguide). If this is fulfilled, the light will or may experience total-internal reflection even in case the object (not illustrated) touches the first surface 24 of the waveguide. Hence, the light will remain undisturbed while being guided in the waveguide. Light from the light source may be coupled into the waveguide substantially parallel with the first surface 24 of the waveguide. The angle of propagation θ may be 90 degrees or around 90 degrees. Thus, light 4 may propagate in the x-y plane (i.e. without diverging substantially in the z-direction) (it is assumed that the plane of the waveguide is in the x-y plane) when propagating towards a redirecting structure or towards the detector. In particular, when propagating in the medium next to the waveguide from the first redirecting structure towards the second redirecting structure (or from the third redirecting structure towards the fourth redirecting structure), light 4 may be at least substantially collimated such that it does not displace substantially along the z-axis during propagation.

In order for the object to be encoded, it may not be required that the object physically contacts the first surface of the waveguide. In order for the object to be encoded, it may be sufficient that the object disturbs light to an extent sufficient for creating a detectable change in the light intensity distribution at the detector array. Thus, an encoded position may be the position at which the light is disturbed by the object.

In the first embodiment, the redirecting structures 18, 22, 36, 40 are segmented, as shown in FIGS. 1 and 3, and assume the shape of parabolic Fresnel reflectors. An advantage of the segmented reflectors is that they require less space compared to e.g. non-segmented parabolic or elliptic reflectors. However, the redirecting structures 18, 22, 36, 40 may comprise parabolic or elliptic reflectors that are not segmented.

Figure 6:
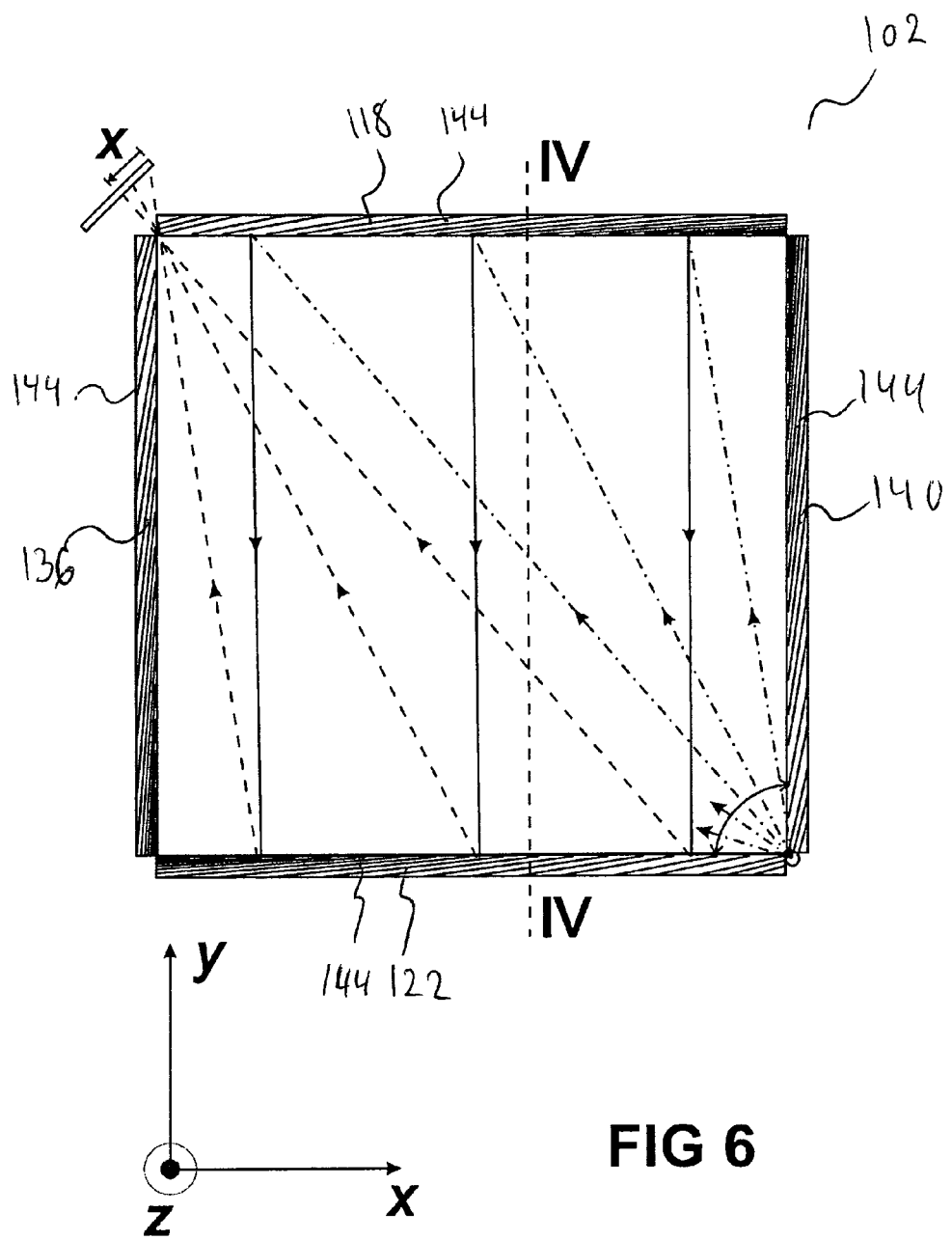
Figure 7:
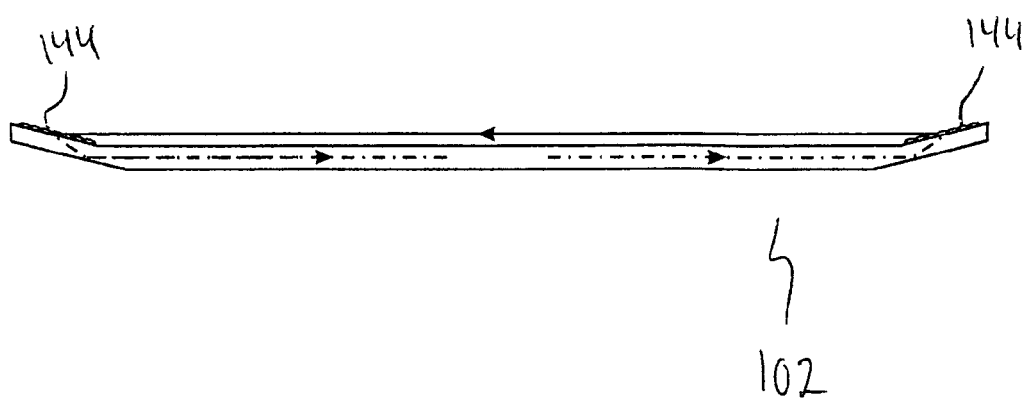
FIG. 7 illustrates an exemplary cross section along the line IV-IV of FIG. 6.
Figure 7:
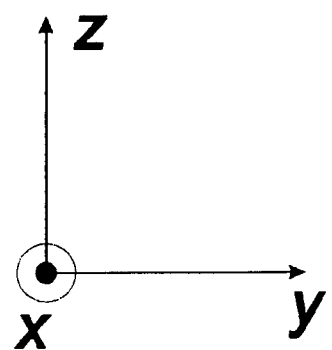
Figure 8:
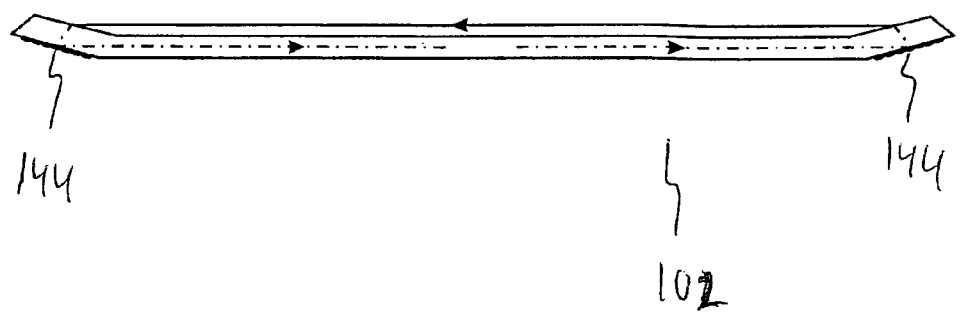
FIG. 8 illustrates an exemplary cross section along the line IV-IV of FIG. 6, FIG. 9 schematically illustrates a plane view of an embodiment having a cylindrically shaped corner, FIG. 10 schematically illustrates a plane view of an embodiment where the light source and the detector are positioned at the same corner.
Figure 8:
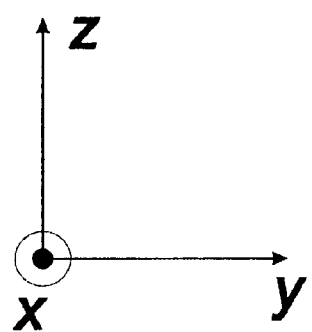

In a second embodiment of a device 102 according to the present invention, the redirecting structures 118, 122, 136, 140 may comprise diffractive surface relief structures 144, as schematically illustrated in FIG. 6. The diffractive structures 144 may be transmission structures as the ones shown in FIG. 7 or they may be reflective as shown in FIG. 8.

Figure 9:
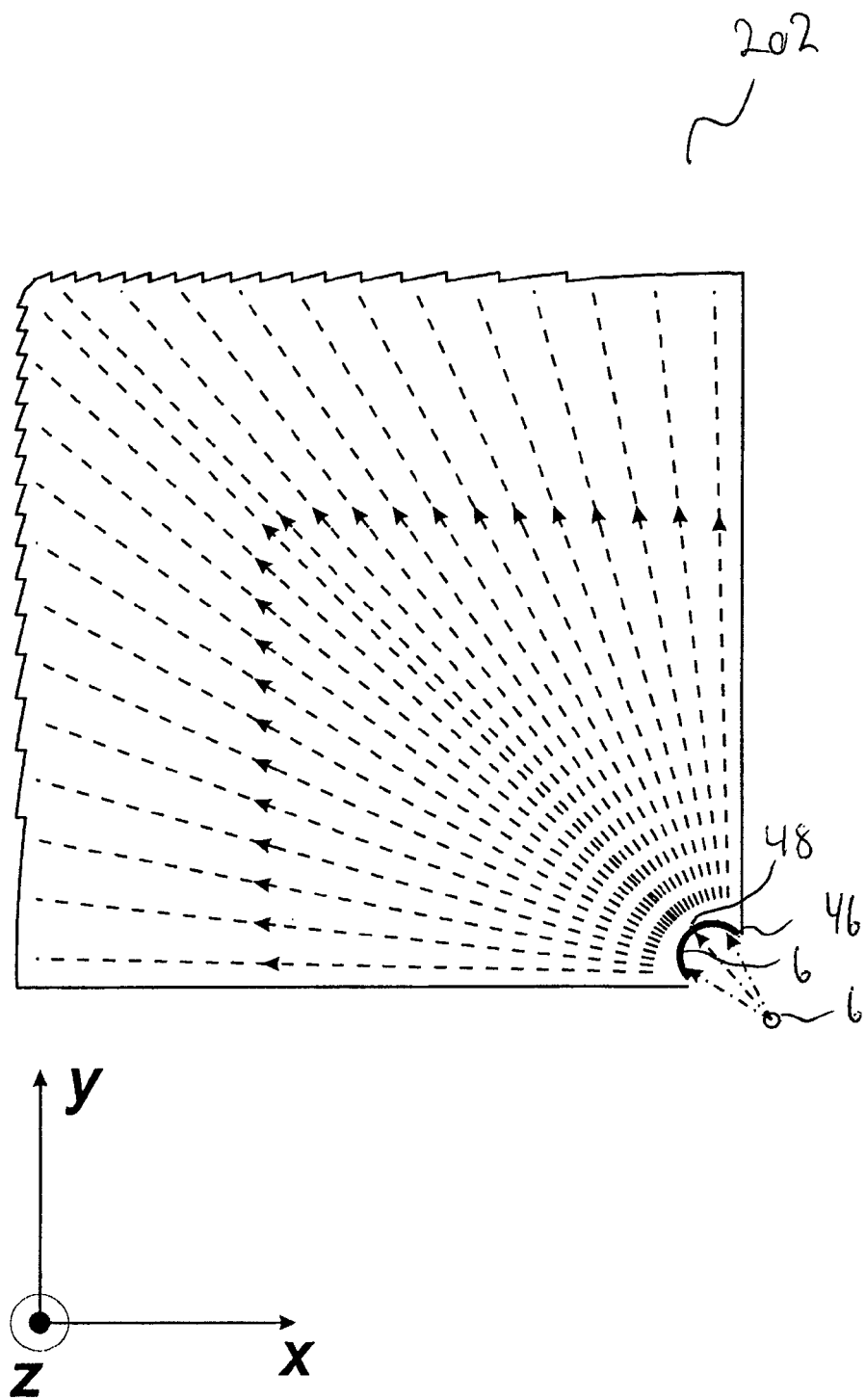

In embodiments, e.g. 202, the first corner of the waveguide is shaped as either a concave or a convex cylindrical lens 46, in order to achieve the desired divergence angle of the light source 6, see FIG. 9. In FIG. 9 only a first part of the light paths from the lens 46 is illustrated. Furthermore, for simplicity, a second redirecting structure and a fourth redirecting structure is not illustrated in FIG. 9.

The light source may comprise a cylindrical lens. A central segment 48, see FIG. 9, of the cylindrical lens may be missing or blocked in order to avoid direct light being transmitted to the detector array.

Figure 10:
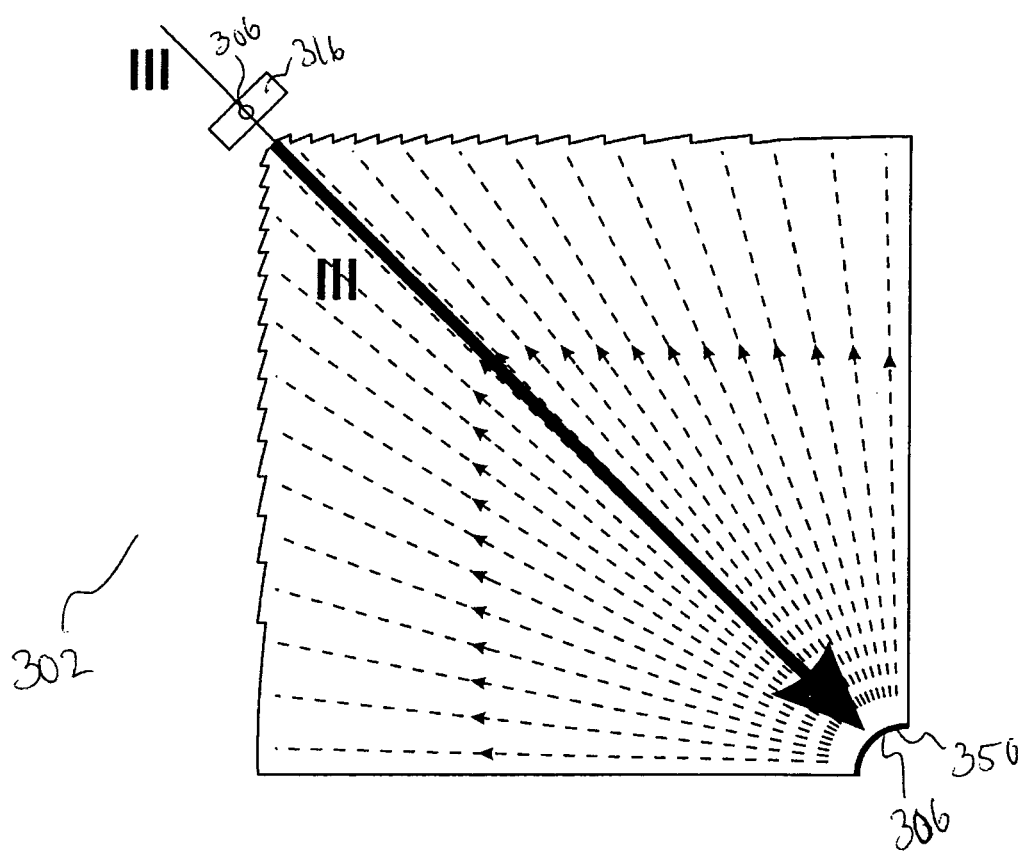
Figure 10:
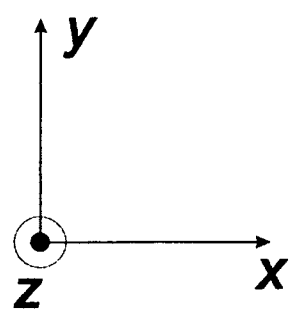

In embodiments, e.g. 302, the light source 306 and the detector array 316 are placed on top of each other. Furthermore, the light source 306 may comprise a reflective cylinder 350 positioned at the first corner of the waveguide, such that the reflective cylinder function as a point source, see FIGS. 10 and 11. An advantage of this embodiment is that both the light source and the detector array may be placed on the same printed circuit board. In FIG. 10 only a first part of the light paths from the light source 306 is illustrated. Furthermore, for simplicity, a second redirecting structure and a fourth redirecting structure is not illustrated in FIG. 10.

Figure 11:
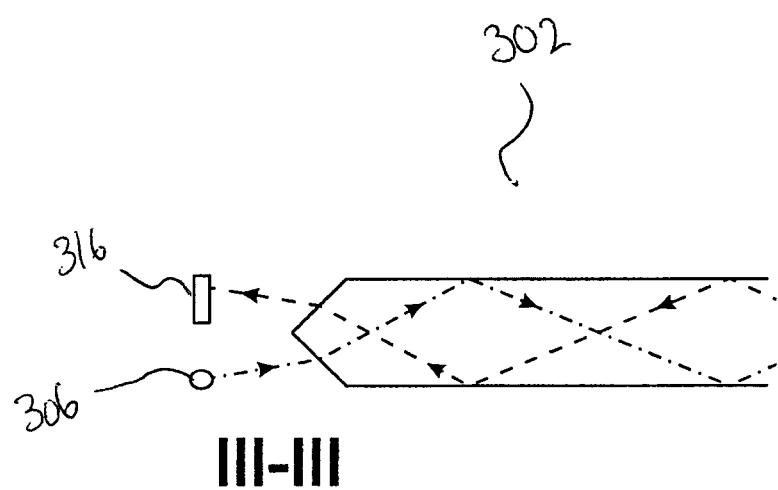
FIG. 11 illustrates a cross sectional view taken along the line III-III in FIG. 10.

FIG. 11 illustrates a cross sectional view taken along the line in FIG. 10. It is illustrated how light (the dot-and-dash line) may be emitted from the light source 306 into the waveguide, while returned light (the broken line) is directed towards the detector 316.

Figure 13:
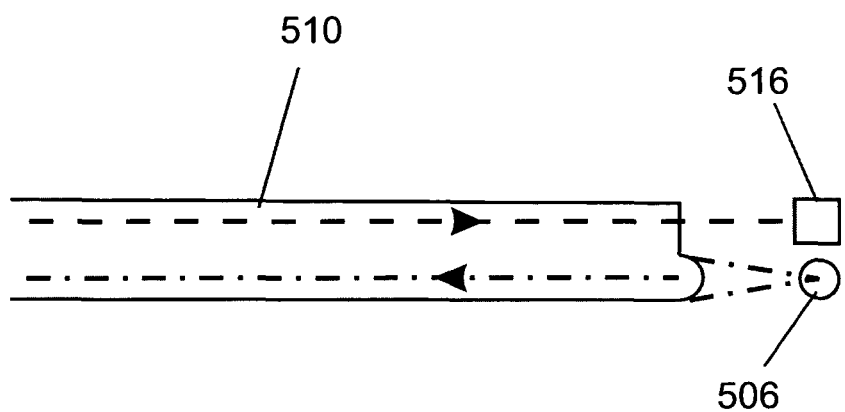
FIG. 13 illustrates a cross sectional view of a part of an embodiment according to the present invention.

FIG. 13 illustrates a cross sectional view of a part of an embodiment according to the present invention. The illustrated embodiment illustrates an alternative to the part of FIG. 10 that is illustrated in FIG. 11. In FIG. 13 light (the dot-and-dash line) is emitted from the light source 506 into the waveguide 510 and light (i.e. returning light) (the broken line) from the waveguide 510 is detected by the detector 516.

Figure 12:
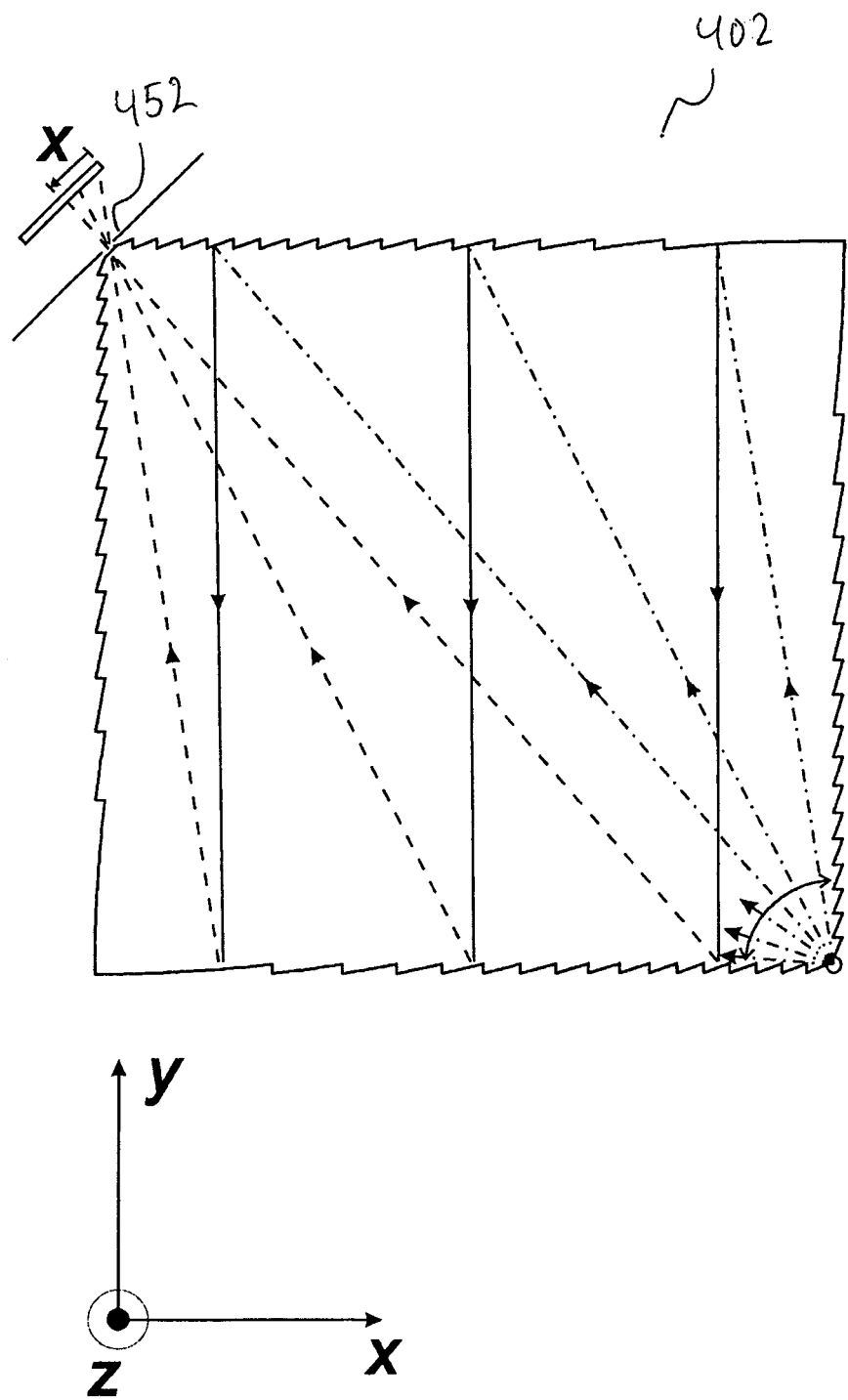
FIG. 12 illustrates a plane view of an embodiment according to the present invention.

In embodiments, e.g. 402, a spatial filter 452 is positioned at the second corner, of the waveguide to remove unwanted scattered light, see FIG. 12.

The number of redirecting structures may comprise a third redirecting structure and a fourth redirecting structure. Having a third and a fourth redirecting structure may improve or enable the ability of the device to encode a two-dimensional position of an object.

The object may for instance be a finger of a user or a stylus.

The planar waveguide may be configured for guiding a second part of the light from the light source towards the third redirecting structure. The third redirecting structure may be configured for redirecting the second part of the light towards the fourth redirecting structure e.g. by coupling the second part of the light out of the waveguide and e.g. at least substantially collimating the second part of the light into e.g. a second plurality of at least substantially collimated rays that e.g. traverse e.g. the area (e.g. the first area) in the space (or a second area next to the first area, which second area is in the first space) next to the first surface of the planar waveguide e.g. towards the fourth redirecting structure.

When coupling light out of the waveguide, such as during propagation from the first redirecting structure towards the second redirecting structure or during propagation from the third redirecting structure towards the fourth redirecting structure, it may be an advantage that the divergence perpendicular to the first surface of the waveguide is small. Thereby it may be achieved that the major part of the light may arrive at the intended redirecting structure unless the light is disturbed by the object.

The first plurality of at least substantially collimated first rays may form an intersection angle with the second plurality of collimated rays. The intersection angle may be in the range from 60° to 120°, such as in the range from 75° to 115°, preferably 90°.

The fourth redirecting structure may be configured for redirecting the second plurality of at least substantially collimated rays towards the detector e.g. by coupling the second plurality of at least substantially collimated rays back into the waveguide and e.g. directing, e.g. focusing, the second plurality of light rays towards the detector.

The object may disturb a second ray of the second plurality of at least substantially collimated rays when the object is at least partly positioned in the space during operation of the device.

The detector may be a detector array for position encoding the object. Having a detector enables that input by an object that disturbs light of the device may be encoded. Having a detector array may furthermore enable encoding of different positions of an object that disturbs light of the device.

The first plurality of light rays may be directed towards a first part of the detector array and the second plurality of light rays may be directed towards a second part of the detector array. This may provide an improved encoding of a two-dimensional position of an object.

If the object disturbs the first light ray and the second light ray, the object may cause a reduction of light intensity on a first area of the first part of the detector array and may cause a reduction of light intensity on a second area of the second part of the detector array.

One, more or all of the redirecting structures may comprise Fresnel reflectors. This may provide an improved redirection of light.

One, more or all of the redirecting structures may comprise diffractive structures. This may provide an improved redirection of light.

The light source may comprise a cylindrical surface part. A cylindrical surface part that forms part of the light source may additionally form part of the waveguide. A cylindrical surface part may improve the dispersion of light from the light source.

A part of the cylindrical surface part may be blocked, such that light is prevented from travelling along a straight line from the emitter towards the detector seen in the plane of the planar waveguide.

The method according to the present invention may comprise a device according to the present invention.

In accordance with the present invention, a position encoder may be provided, in which light from an essentially point-like light source is coupled into a planar waveguide at one corner (a first corner). The light may be guided inside the waveguide to illuminate two sides that are opposite to the corner (i.e. two sides that border on a corner that are opposite to the first corner). At these two sides, two redirecting structures may couple out and at least substantially collimate the light to form two at least substantially orthogonal light sheets that traverse the waveguide (i.e. traverse the waveguide outside the waveguide). At the opposite sides of the two redirecting structures, two additional redirecting structures may capture the light sheets and couple the light back into the waveguide and, in addition, focus the light sheets at a second corner of the waveguide. At this (second) corner light may be coupled out to illuminate a detector array, or light may not be coupled out of the waveguide, but may be directed at a detector array that is situated at the corner, such as preceding or succeeding the focal point of the light. If an object touches or is in close proximity of the waveguide, and thereby blocks at least part of the two light sheets, two corresponding shadows may appear at the detector array. The position of the two corresponding shadows may be directly, connected to the x-y coordinates of the object.

The waveguide may have four sides (or ends or edges) comprising a first side, a second side, a third side, and a fourth side. The waveguide may furthermore have four corners comprising a first corner, a second corner, a third corner, and a fourth corner connecting the four sides. The four sides may be substantially perpendicular to the plane of the waveguide.

The first redirecting structure may extend along the first side of the waveguide.

The second redirecting structure may extend along a second side of the waveguide The second side of the waveguide may be substantially opposite to the first side of the waveguide.

The third redirecting structure may extend along a third side of the waveguide.

The third side of the waveguide may be substantially perpendicular to the first side of the waveguide, The fourth redirecting structure may extend along the fourth side of the waveguide.

The fourth side of the waveguide may be substantially opposite to the third side of the waveguide.

The light source may be positioned at a first corner of the waveguide.

The first corner may be positioned between the second side of the waveguide and the fourth side of the waveguide.

The detector array may be positioned at the second corner of the waveguide.

The second corner may be positioned between the first side of the waveguide and the third side of the waveguide.

Light from the light source may be coupled (or emitted) from the light source into the waveguide, in such a way that the waveguide guides a first part of the light towards the first redirecting structure and a second part of the light towards the third redirecting structure.

The first redirecting structure and the third redirecting structure may, respectively, couple the light from the light source out of the waveguide and shape the light parts into two at least substantially collimated sheets of light, respectively, both sheets of light being at least substantially parallel to the plane of the waveguide, such that the two sheets of light traverse the waveguide close to the waveguide in directions that are at least substantially orthogonal to each other.

The light sheets may illuminate the second and the fourth redirecting structures, respectively, such that the second and the fourth redirecting structures, respectively, couple the two light parts back into the waveguide and focus both light parts towards at the second corner of the waveguide.

The two parts of light may be directed (or may be coupled out and directed) at separate parts of the detector array, such that the object that obstructs parts of the two perpendicular light sheets that respectively propagate above the waveguide will result in two separate shadows appearing at each part of the detector array.

Light from the light source may be coupled or guided into the waveguide by means of one or more lenses, such as two lenses, e.g. two cylindrical lenses. The one or more lenses may provide that light is spread in the plane of waveguide.

Further examples of a detector array, light source, waveguide, and redirecting structures are disclosed in international patent application publication number WO 2009/086836 A1.

The invention claimed is:

1. A device for encoding input from an object, the device comprising:
   a light source,
   a waveguide,
   a number of redirecting structures, and
   a detector, wherein
   the waveguide comprising a planar waveguide having a first surface and a second surface,
   the number of redirecting structures comprising a first redirecting structure and a second redirecting structure,
   the light source being configured for emitting light into the waveguide, such that the planar waveguide guides a first part of the light from the light source towards the first redirecting structure,
   the first redirecting structure being configured for redirecting the first part of the light towards the second redirecting structure by coupling the first part of the light out of the waveguide and collimating the first part of the light into a first plurality of collimated rays that traverse an area in a space next to the first surface of the planar waveguide towards the second redirecting structure,
   the second redirecting structure being configured for redirecting the first plurality of collimated rays towards the detector by coupling the first plurality of collimated rays back into the waveguide and directing the first plurality of light rays towards the detector, and wherein
   the object disturbing a first ray of the first plurality of collimated rays when the object is at least partly positioned in the space during operation of the device.

2. A device according to claim 1, wherein
   the number of redirecting structures comprising a third redirecting structure and a fourth redirecting structure,
   the planar waveguide being configured for guiding a second part of the light from the light source towards the third redirecting structure,
   the third redirecting structure being configured for redirecting the second part of the light towards the fourth redirecting structure by coupling the second part of the light out of the waveguide and collimating the second part of the light into a second plurality of coilimated rays that traverse the area in the space next to the first surface of the planar waveguide towards the fourth redirecting structure, the first plurality of coilimated first rays forming an intersection angle with the second plurality of coilimated rays, and
   the fourth redirecting structure being configured for redirecting the second plurality of collimated rays towards the detector by coupling the second plurality of coilimated rays back into the waveguide and directing the second plurality of light rays towards the detector, and wherein
   the object disturbing a second ray of the second plurality of coilimated rays when the object is at least partly positioned in the space during operation of the device.

3. A device according to claim 2 wherein the detector is a detector array.

4. A device according to claim 3, wherein the first plurality of light rays are directed towards a first part of the detector array and the second plurality of light rays are directed towards a second part of the detector array.

5. A device according to claim 4, wherein the object disturbing the first light ray and the second light ray cause a reduction of light intensity on a first area of the first part of the detector array and cause a reduction of light intensity on a second area of the second part of the detector array.

6. A device according to claim 1, wherein the redirecting structures comprises Fresnel reflectors.

7. A device according to claim 1, wherein the redirecting structures comprises diffractive structures.

8. A device according to claim 1, wherein the light source comprises a cylindrical surface part.

9. A device according to claim 8, wherein a part of the cylindrical surface part is blocked, such that light is prevented from travelling along a straight line from the emitter towards the detector seen in the plane of the planar waveguide.

10. A method of encoding an object in the vicinity of a device comprising:

a light source, a waveguide comprising a planar waveguide having a first surface and a second surface, a number of redirecting structures comprising a first redirecting structure and a second redirecting structure, and a detector, the method comprising emitting light from the light source into the waveguide, such that the planar waveguide guides a first part of the light from the light source towards the first redirecting structure, redirecting the first part of the light towards the second redirecting structure by coupling the first part of the light out of the waveguide and collimating the first part of the light into a first plurality of collimated rays that traverse an area in a space next to the first surface of the planar waveguide towards the second redirecting structure, using the first redirecting structure, redirecting the first plurality of collimated rays towards the detector by coupling the first plurality of collimated rays back into the waveguide and directing the first plurality of light rays towards the detector, using the second redirecting structure, and wherein the object disturbing a first ray of the first plurality of collimated rays when the object is at least partly positioned in the space during operation of the device.

11. A method according to claim 10, wherein the device is a device according to claim 1.

* * * * *